United States Patent [19]

Matsuura

[11] Patent Number: 4,557,519
[45] Date of Patent: Dec. 10, 1985

[54] AUTOMOBILE BODY STRUCTURE

[75] Inventor: Osamu Matsuura, Hiroshima, Japan

[73] Assignee: Mazda Motor Corporation, Hiroshima, Japan

[21] Appl. No.: 458,884

[22] Filed: Jan. 18, 1983

[30] Foreign Application Priority Data

Jan. 27, 1982 [JP] Japan .................................. 57-11966

[51] Int. Cl.⁴ .............................................. B62D 23/00
[52] U.S. Cl. .................................... 296/204; 296/188; 296/209; 296/29
[58] Field of Search ............... 296/203, 204, 209, 187, 296/188, 29, 30, 205, 193–195; 280/784, 794, 800, 792, 713, 725, 726

[56] References Cited

U.S. PATENT DOCUMENTS

| 2,066,019 | 12/1936 | Swallow | 280/794 |
| 2,257,665 | 9/1941 | Almdale | 280/800 |
| 2,507,845 | 5/1950 | Ziegler | 280/800 |
| 2,597,841 | 5/1952 | Ridgway | 296/29 |
| 3,049,359 | 8/1962 | Geyer | 280/725 |
| 3,108,836 | 10/1963 | Deckert | 296/204 |
| 3,292,969 | 12/1966 | Eggert, Jr. | 296/205 |
| 3,791,472 | 2/1974 | Tatsumi | 296/204 |
| 3,804,464 | 4/1974 | Gust | 296/29 |
| 4,129,330 | 12/1978 | Schwuchow | 296/204 |
| 4,262,929 | 4/1981 | Pierce | 280/725 |

FOREIGN PATENT DOCUMENTS

| 857896 | 12/1952 | Fed. Rep. of Germany | 280/784 |
| 2080211 | 2/1982 | United Kingdom | 296/204 |

Primary Examiner—Randolph A. Reese
Assistant Examiner—Dennis H. Pedder
Attorney, Agent, or Firm—Murray, Whisenhunt and Ferguson

[57] ABSTRACT

An automobile body structure has a closed cross-section structure formed by a lower face of a rear floor panel of a body floor and a rear frame joined to the lower face of the rear floor panel and extended in the longitudinal direction of the body on either side thereof, and another closed cross-section structure formed by a lower face of a front floor panel of the body floor and a front frame joined to the lower face of the front floor panel and extended in the longitudinal direction of the body. The rear frame is joined at its forward extension to a side sill of the body forward of a rear wheelhouse. The front frame is joined at its rearward extension to the portion where the forward extension of the rear frame is joined to the side sill.

13 Claims, 9 Drawing Figures

F I G. I
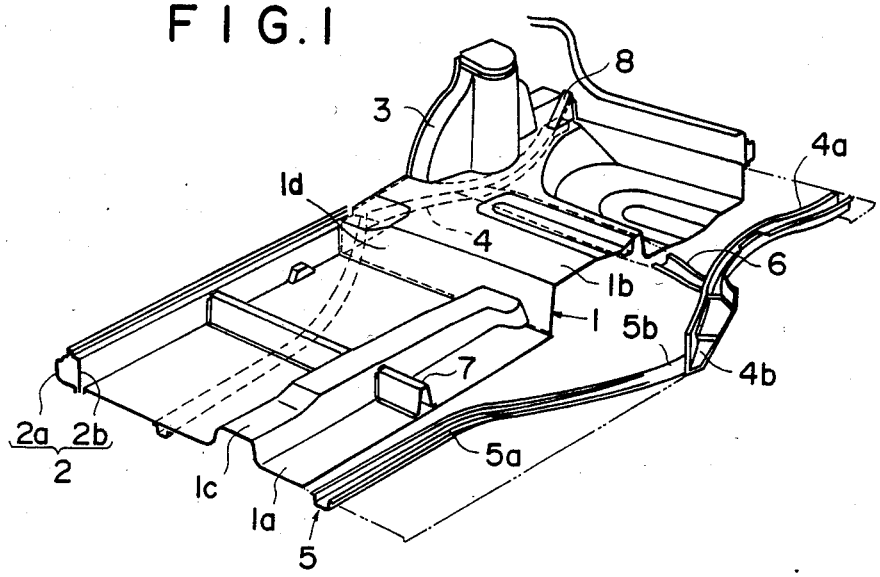
F I G. 2
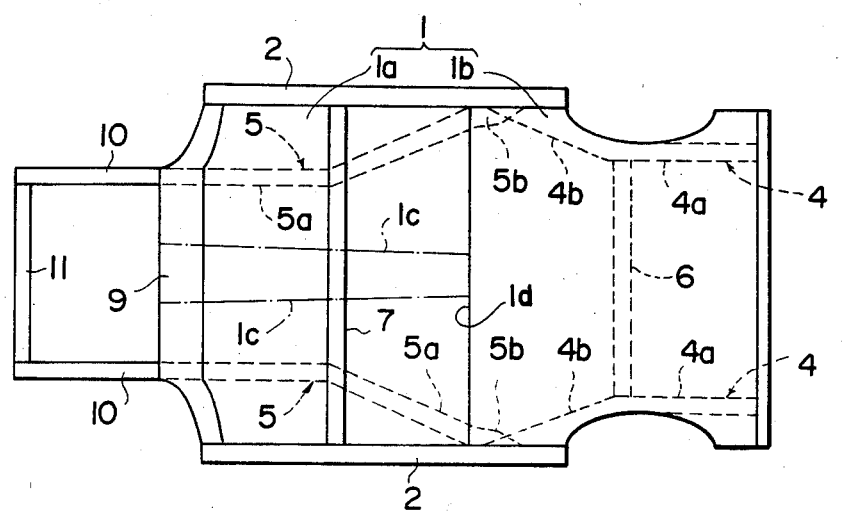
F I G. 3
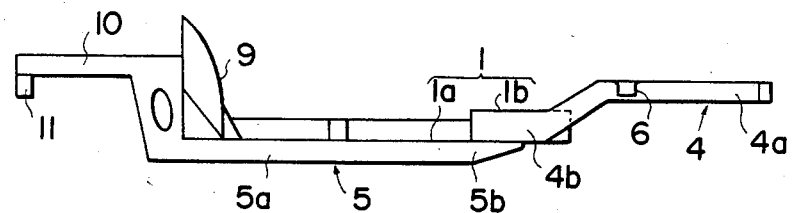

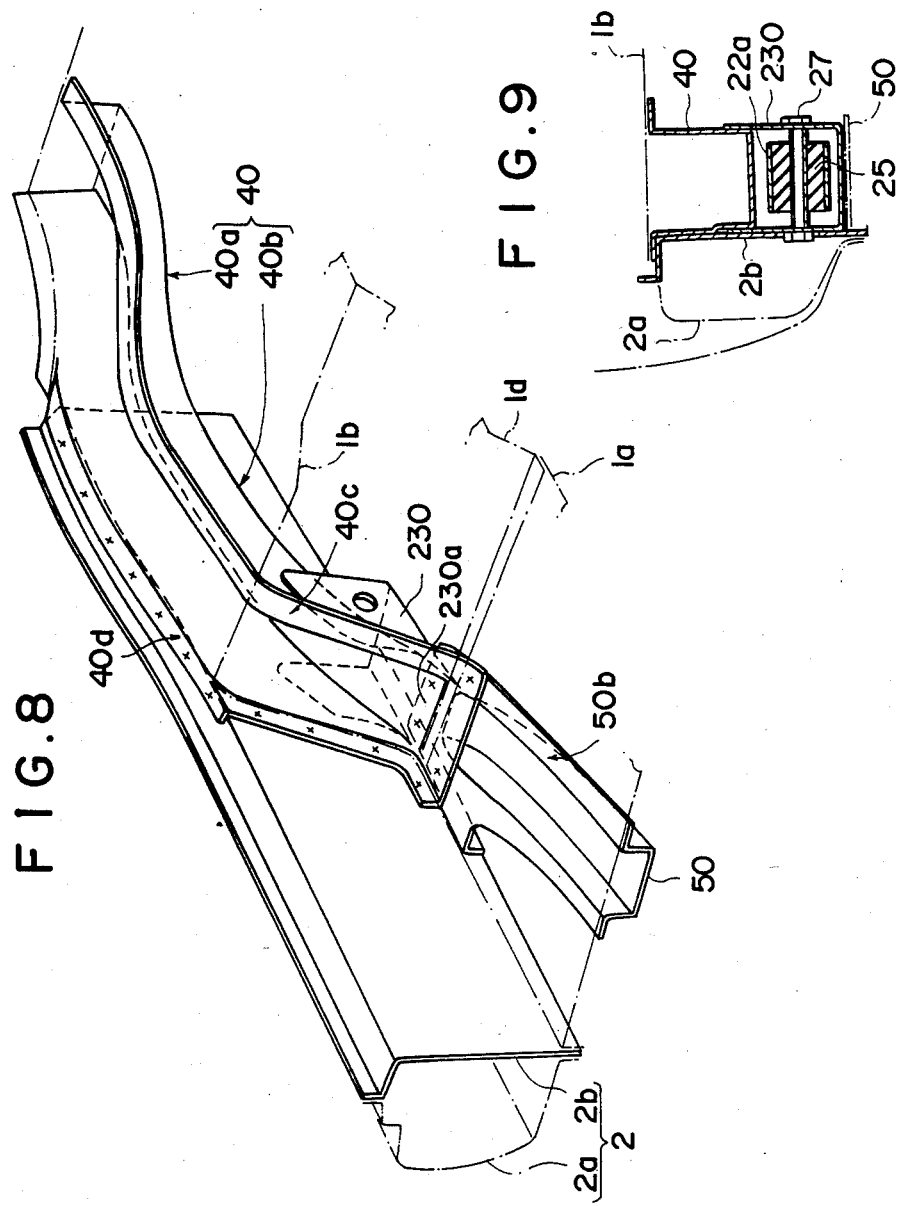

AUTOMOBILE BODY STRUCTURE

BACKGROUND OF THE INVENTION

1. Field of the Invention

This invention relates to an automobile body structure, and more particularly to a monocoque type automobile body structure.

2. Description of the Prior Art

In order to increase the rigidity of an automobile body structure, it has been proposed, as disclosed in Japanese Unexamined Utility Model Publication No. 56(1981)-46474, to directly connect a rear frame member (rear side member) joined to the lower face of the rear floor panel of the body floor so as to form a closed cross-section structure extending in the longitudinal direction of the body with a front frame member (front side member) joined to the lower face of the front floor panel of the body floor thereby to form a closed cross-section structure extending in the longitudinal direction of the body. This automobile body structure is also provided with a cross member for improving the rigidity of the body in the crosswise direction thereof.

However, in the proposed automobile body structure, the closed cross-section structure formed by the floor panel and the rear frame member or the front frame member on either side of the vehicle body is simply positioned approximately in parallel with the side sill. Accordingly, the body structure cannot exhibit sufficient strength against a large torsional force. Further, since external loads such as impact loads exerted from the bumper are borne mainly by the closed cross-section structure formed by the rear frame member and the front frame member on either side of the body, the strength of the body structure against external loads is not sufficient.

SUMMARY OF THE INVENTION

The primary object of the present invention is to provide an improved monocoque type automobile body structure.

Another object of the present invention is to provide a monocoque type automobile body structure exhibiting improved strength against torsional force or the like.

The specific object of the present invention is to provide a monocoque type automobile body structure exhibiting improved strength against external loads such as impact loads exerted from the bumper.

The automobile body structure in accordance with the present invention comprises a closed cross-section structure formed by a lower face of a rear floor panel of a body floor and a rear frame member joined to said lower face of said rear floor panel and extended in the longitudinal direction of the body on either side thereof, and another closed cross-section structure formed by a lower face of a front floor panel of said body floor and a front frame member joined to said lower face of said front floor panel and extended in the longitudinal direction of the body on either side thereof, said rear frame member being joined at the forward extension thereof to a side sill at the side portion of said body floor forward of a rear wheelhouse, said front frame member being joined at the rearward extension thereof to the joint portion of said forward extension of said rear frame member with said side sill.

In the present invention, the rear frame member is extended forwardly of the rear wheelhouse and joined to the side sill, and the front frame member is extended rearwardly and connected to the portion where the rear frame member is joined to the side sill. Accordingly, the closed cross-section structure constituted by the rear frame member, the front frame member and the side sill on either side of the automobile body greatly improves the strength of the whole body. Further, since a load applied to the rear frame, for example, a load applied from the rear suspension or the like, is distributed to the side sill and the front frame member, the body structure in accordance with the present invention also exhibits a high strength against loads of this type. This is very advantageous in practical use.

BRIEF DESCRIPTION OF THE DRAWINGS

FIG. 1 is a perspective view showing the automobile body structure in accordance with the present invention, with a portion of the floor panel broken away for clarity, FIG. 2 is a schematic plan view showing the automobile body structure in accordance with the present invention, FIG. 3 is a schematic side view showing the automobile body structure in accordance with the present invention, FIGS. 7 and 8 are perspective views showing modified forms of parts of the automobile body structure in accordance with the present invention, and FIG. 9 is a sectional view showing a modified form of a part of the automobile body structure in accordance with the present invention.

DESCRIPTION OF THE PREFERRED EMBODIMENTS

Figure 4:
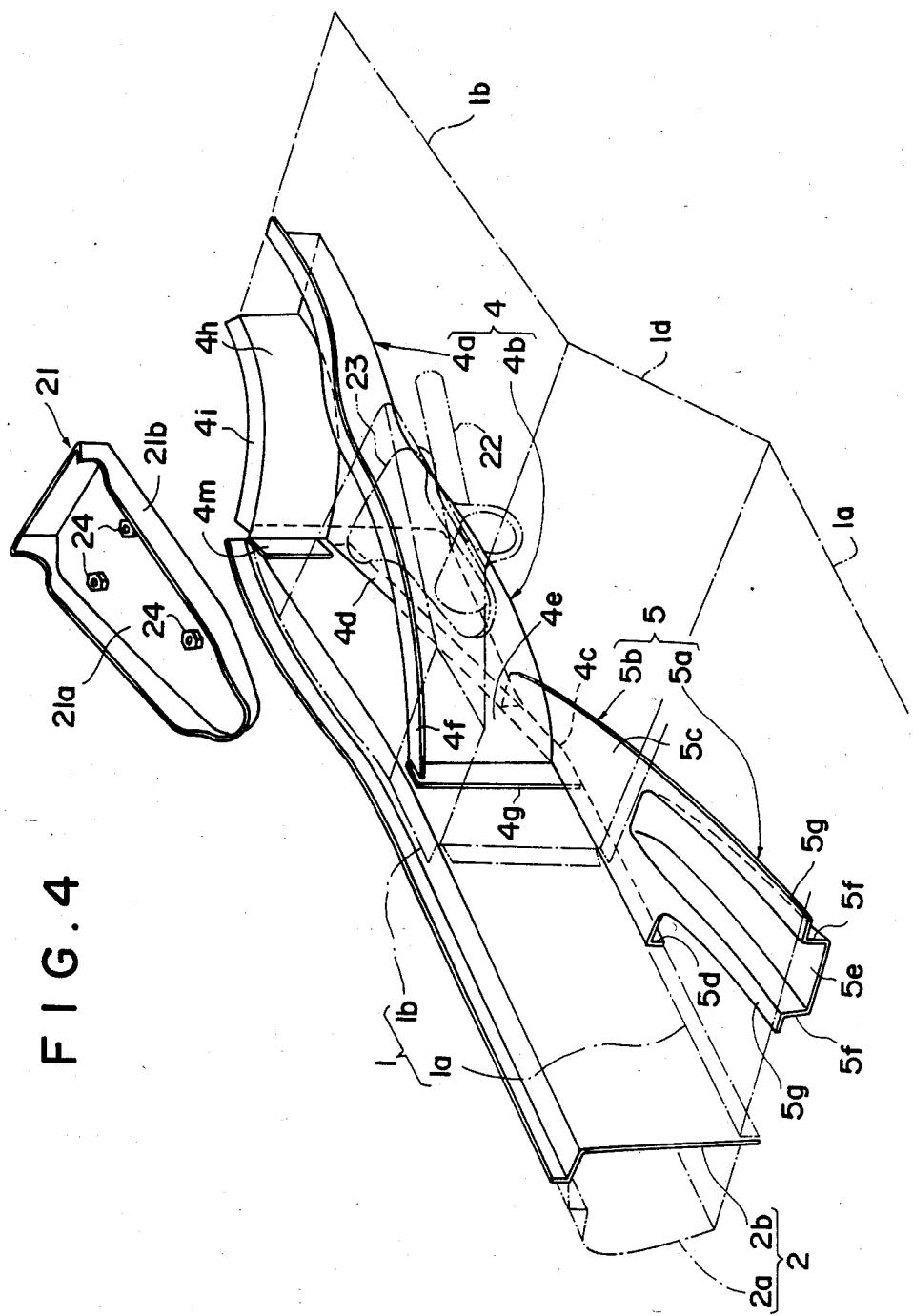
FIG. 4 is an enlarged perspective view showing the portion forward of the rear wheelhouse in the automobile body structure in accordance with the present invention.

Referring to FIGS. 1 to 3 showing an embodiment of the basic automobile body structure in accordance with the present invention, a floor panel 1 constituting the automobile body floor comprises a front floor panel 1a and a rear floor panel 1b which are joined to each other. Each side edge of the front floor panel 1a is joined to the lower portion of a side sill 2 which consists of an outer panel 2a and an inner panel 2b and has a closed cross-section extending in the longitudinal direction of the automobile body. The rear floor panel 1b is positioned on a level higher than the front floor panel 1a. The front end of the rear floor panel 1b is extended downwardly and joined to the front floor panel 1a. This extension of the rear floor panel 1b forms a kick-up portion 1d. The rear end of the side sill 2 is connected to a rear wheel-house 3.

A rear frame member 4 is joined to the lower face of the rear floor panel 1b and forms a closed cross-section structure extending in the longitudinal direction of the automobile body. The rear frame member 4 essentially consists of a base portion 4a having an approximately hat-like cross-section and a forwardly extended portion 4b having an approximately L-shaped cross-section.

The forward extension 4b is extended forwardly of the rear wheelhouse 3 and joined to the side sill 2 at the side portion of the rear floor panel 1b.

A front frame member 5 is joined to the lower face of the front floor panel 1a and forms a closed cross-section structure extending in the longitudinal direction of the automobile body. The front frame member 5 essentially consists of a base portion 5a having an approximately hat-like cross-section and a rearward extension 5b connected to the portion where the forward extension 4b of the rear frame member 4 is joined to the side sill 2. As may best be seen in FIG. 3, the rear frame members 4 are positioned on a level higher than the front frame members 5, and the forward extensions 4b of the rear frame members 4 are inclined downwardly.

A cross member 6 having an approximately hat-like cross-section is joined to the lower face of the rear floor panel 1b and constitutes a closed cross-section structure extending in the crosswise direction of the automobile body. Another cross member 7 having an approximately hat-like cross-section is joined to the upper face of the front floor panel 1a and forms another closed cross-section structure extending in the crosswise direction of the automobile body. The cross member 7 is divided into two portions by a tunnel portion 1c formed on the front floor panel 1a.

The rear portion of the rear frame member 4 is connected to a rear bumper (not shown) by a bumper gusset 8. The reference numeral 9 designates a dash panel. Front side frame members 10, 10 are connected to the front frame members 5, 5, and the front end portions of the front side frame members 10, 10 are connected with each other by a cross member 11.

The connection between the rearward extension 5b of the front frame member 5 and the portion where the forward extension 4b of the rear frame member 4 is joined to the side sill 2 at the position between the kick-up portion 1d and the rear wheelhouse 3 will now be described in detail with reference to FIGS. 4 to 6.

Figure 5:
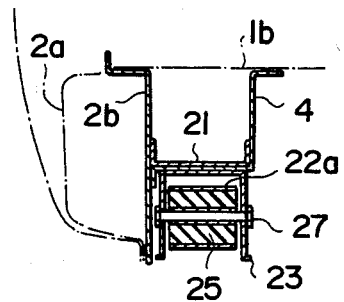
FIG. 5 is a sectional view showing a portion supporting a trailing arm in the automobile body structure in accordance with the present invention.

As shown in FIG. 4, the forward extension 4b of the rear frame member 4 having the front end joined to the inner panel 2b of the side sill 2 is basically formed so as to have an approxmately L-shaped cross-section by a lower flange portion 4c for joining to the inner panel 2b, a horizontal portion 4d continuing into the upper edge of the lower flange portion 4c, an intermediate upright portion 4e continuing into the inner edge of the horizontal portion 4d, and an upper flange portion 4f continuing into the upper edge of the upright portion 4e. The front edge of the intermediate upright portion 4e continues into an intermediate flange portion 4g for joining to the inner panel 2b.

The base portion 4a continuing into the rear side of the forward extension 4b is formed by the horizontal portion 4d, the intermediate upright portion 4e and the upper flange portion 4f, which respectively continue into the horizontal portion, the intermediate upright portion and the upper flange portion of the forward extension 4b. The base portion 4a is also provided with another intermediate upright portion 4h continuing into the outer edge of the horizontal portion 4d, another upper flange portion 4i continuing into the upper edge of the upright portion 4h, and an intermediate flange portion 4m continuing into the front edge of the intermediate upright portion 4h and joined to the inner panel 2b.

In this way, the front end of the rear frame member 4 is joined to the side sill at the lower flange portion 4c and the intermediate flange portions 4g, 4m thereof.

To the portion where the forward extension 4b of the rear frame member 4 is joined to the side sill 2 is also connected the rearward extension 5b of the front frame member 5. The rearward extension 5b is provided with a flat horizontal portion 5c and a connection flange portion 5d continuing downwardly from the outer edge of the horizontal portion 5c. The connection flange portion 5d is connected to the inner panel 2b of the side sill 2 and the lower flange portion 4c of the rear frame member 4. The front side of the rear extension 5b continues into the base portion 5a which has a hat-like cross-section and comprises a lower horizontal portion 5e, intermediate upright portions 5f, 5f continuing respectively into the inner and outer edges of the horizontal portion 5e, and upper flange portions 5g, 5g continuing respectively into the upper edges of the upright portions 5f, 5f and also into the horizontal portion 5e as shown.

To the upper face of the forward extension 4b of the rear frame member 4 is secured a reinforcement 21 having approximately triangular geometry and comprising a base plate 21a and an upright flange portion 21b continuing into the peripheral edge of the base plate 21a, thereby to increase the strength of the forward extension 4b. Further, a supporting bracket 23 for a trailing arm 22 rotatably supporting a rear wheel (not shown) is mounted on the lower face of the forward extension 4b. The supporting bracket 23 may be mounted on the lower face of the forward extension 4b by screwing bolts (not shown) into nuts 24 secured to the upper face of the reinforcement 21 through mounting holes 23a of the supporting bracket 23.

Figure 6:
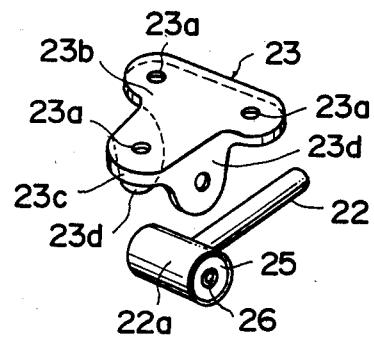
FIG. 6 is an exploded perspective view showing the trailing arm and a supporting bracket in the automobile body structure in accordance with the present invention.

As shown in FIG. 6, the supporting bracket 23 comprises a base plate 23b and an upright flange portion 23c continuing into the peripheral edge of the base plate 23b. Parts of the upright flange portion 23c are enlarged to form bearing portions 23d, 23d for supporting the trailing arm 22. Further, as shown in FIG. 5, the bearing portions 23d, 23d rotatably support a cylindrical portion 22a of the trailing arm 22 by means of a rotation shaft 27 via a rubber bushing 25 and a sleeve 26.

In the embodiment described above, since the closed cross-section structures of the rear frame member 4 and the front frame member 5 are connected to the closed cross-section structure of the side sill 2 having a large strength, the strength of the automobile body in the longitudinal direction and the strength thereof in the crosswise direction are both increased by the cooperation of the three closed cross-section structures, resulting in improved strength of the whole body. Particularly, since the forward extension 4b of the rear frame member 4 to which an external load is applied from the trailing arm 22 is connected to the side sill 2 and the front frame member 5, the external load is distributed to the side sill 2 and the front frame member 5. Further, an external load applied from the rear bumper (not shown) to the rear frame member 4 via the bumper gusset 8 is similarly distributed to the side sill 2 and the front frame member 5. This is very advantageous in practical use of the automobile body.

Figure 7:
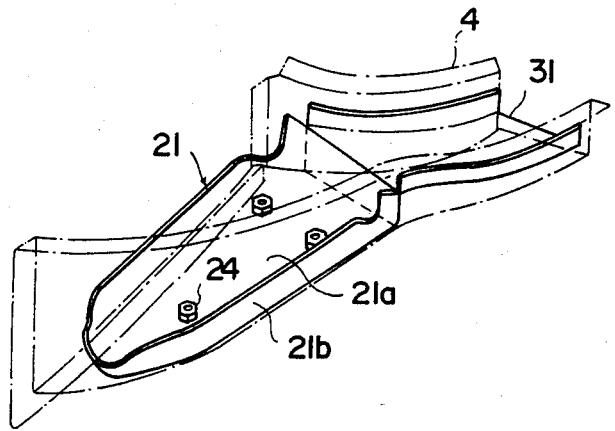

In the embodiment discribed above, the reinforcement 21 is provided only for the forward extension 4b of the rear frame member 4. However, as shown in FIG. 7, it is also possible to position another reinforcement 31 also for the base portion 4a, and connect the front end of the reinforcement 31 to the rear end of the aforesaid reinforcement 21, thereby to further increase the strength of the automobile body. As may be readily seen in FIG. 7, the reinforcement 31 vertically partitions the rear frame member 4 (more specifically, the base portion 4a thereof) into two parts in its vertical direction.

FIGS. 8 and 9 show a modified form of a part of the automobile body structure in accordance with the present invention. In FIGS. 8 and 9, a rear frame member 40 comprises a base portion 40a having an approximately hat-like cross-section and a forward extension 40b. The forward extension 40b is positioned along the side sill 2 and joined thereto. The forward extension 40b is provided with an inner flange portion 40c joined to the kick-up portion 1d of the rear floor 1b, and an outer flange portion 40d joined to the upper and side portions of the inner panel 2b of the side sill 2. The front end flange 40e of the forward extension 40b is joined to the lower side of the joint of the front floor 1a with the rear floor 1b. Upper portions of a trailing arm bracket 230 having an approximately U-shaped cross-section are joined to the forward extension 40b of the rear frame member 40 as shown, and the front end 230a of the trailing arm bracket 230 is joined to the rear end portion of a rear extension 50b of a front frame member 50. The trailing arm bracket 230 rotatably supports the cylindrical portion 22a of the trailing arm by means of the rotation shaft 27 via the rubber bushing 25 and the sleeve as described with reference to FIG. 5.

I claim:

1. An automobile body structure comprising a first pair of closed cross-section structures formed by a lower face of a rear floor panel of a body floor and a pair of rear frame members, each having a forward extension, joined to said lower face of said rear floor panel, each of said first pair of closed cross-section structures extending in the longitudinal direction of the body on a respective side thereof, and a second pair of closed cross-section structures formed by a lower face of a front floor panel of said body floor and a pair of front frame members, each having a rearward extension, joined to said lower face of said front floor panel, each of said second pair of closed cross-section structures extending in the longitudinal direction of the body on a respective side thereof, each of said rear frame members being joined at the forward extension thereof to a respective side sill at a respective side portion of said body floor forward of a respective rear wheelhouse, each of said rearward extensions of said front frame members having a first portion vertically overlapping with a respective forward extension of a rear frame member and joined thereto and a second portion directly joined to said respective side sill substantially in front of the joint between said respective forward extension of a rear frame member and said respective side sill.

2. An automobile body structure as defined in claim 1, wherein said rear frame members are positioned on a level higher than said front frame members, and said forward extensions of said rear frame members are inclined downwardly.

3. An automobile body structure as defined in claim 2, wherein each said side sill is formed by an inner panel and an outer panel to have a closed corss-section, said forward extensions of said rear frame members each have a front end flange thereon, and each said front end flange is joined to said inner panel of a respective side sill.

4. An automobile body structure as defined in claim 2, wherein each of said forward extensions of said rear frame members has an essentially hat-like cross-section, an outer side portion and an inner side portion, said inner side portions being disposed adjacent one another and said outer side portions being disposed laterally outwards of the corresponding inner side portions, and each said outer side portion is joined to a respective side sill.

5. An automobile body structure as defined in claim 4, wherein said rear floor panel is positioned on a level higher than said front floor, panel, a front portion of said rear floor panel is extended downwardly and joined to said front floor panel, said front portion of said rear floor panel forming a kick-up portion, and a front portion of each of said forward extensions of said rear frame members is joined to said kick-up portion.

6. An automobile body structure as defined in claim 5, wherein there is also provided a pair of trailing arm brackets, each having an essentially U-shaped cross-section comprising a pair of upwardly extending arms and a base conjoining said arms; an upper portion of each of said arms of said trailing arm bracket joined to a respective forward extension of a rear frame member; and a front end portion of said base of said trailing arm bracket joined to a rear end portion of a respective rearward extension of a front frame member.

7. An automobile body structure as defined in claim 1, wherein said rear floor panel is positioned on a level higher than said front floor panel, a front portion of said rear floor panel is extended downwardly and joined to said front floor panel, said front portion of said rear floor panel forming a kick-up portion, and respective rear frame members, side sills, and front frame members are joined together at a position between said kick-up portion and a respective rear wheelhouse.

8. An automobile body structure as defined in claim 1, wherein a pair of trailing arm supporting brackets are provided, each trailing arm supporting bracket mounted on a lower face of a respective rear frame member, and a trailing arm is mounted on each said supporting bracket.

9. An automobile body structure as defined in claim 8, wherein a respective reinforcement is joined to the portion of each of said rear frame members where the trailing arm supporting bracket is mounted.

10. An automobile body structure as defined in claim 9, wherein a rear portion of said reinforcement vertically partitions said rear frame member.

11. An automobile body structure as defined in claim 9, wherein each said side sill is formed by an inner panel and an outer panel to have a closed cross-section, said rear frame members are positioned on a level higher than said front frame members, said forward extensions of said rear frame members inclined downwardly, and a front end flange of each of said rear frame members is joined to the inner panel of a respective side sill.

12. An automobile body structure as defined in claim 1, wherein said rearward extension of said front frame member has a flat portion thereof joined to a bottom wall of said rear frame member.

13. An automobile body structure as defined in claim 12, wherein said rearward extension of said front frame member has a flange joined to said respective side sill.

* * * * *